United States Patent [19]

Brown et al.

[11] 3,997,708
[45] Dec. 14, 1976

[54] ORGANOCALCIUM PYRIDINE-TYPE POLYMERIZATION INITIATORS

[75] Inventors: James D. Brown; Carl A. Uraneck, both of Bartlesville, Okla.

[73] Assignee: Phillips Petroleum Company, Bartlesville, Okla.

[22] Filed: Feb. 12, 1974

[21] Appl. No.: 441,773

Related U.S. Application Data

[63] Continuation-in-part of Ser. No. 790,429, Jan. 10, 1969, abandoned.

[52] U.S. Cl. .................. 526/183; 260/270 P; 260/270 T; 260/279 R; 260/283 R; 260/290 R; 260/294.8 R; 260/296 D; 260/296 R; 260/297 R; 526/265; 526/328

[51] Int. Cl.$^2$ .......................... C08F 4/44

[58] Field of Search ............ 260/296 D, 82.3, 83.1; 526/180, 183, 204

[56] References Cited

UNITED STATES PATENTS

| 3,103,503 | 9/1963  | Fox ................... 260/89.5       |
| 3,163,630 | 12/1964 | Pampus ............... 260/94.2        |
| 3,272,835 | 9/1966  | Dransfield et al. ........ 260/296 D   |
| 3,277,182 | 10/1966 | Pampus ............... 260/612         |
| 3,491,104 | 1/1970  | Colchester et al. ......... 260/296 D  |
| 3,536,679 | 10/1970 | Langer ............... 260/83.1        |
| 3,631,009 | 12/1971 | Meyer ................ 260/82.3        |
| 3,644,314 | 2/1972  | Onishi ............... 260/84.7        |

FOREIGN PATENTS OR APPLICATIONS 6,607,292  11/1966  Netherlands ............... 260/296 D

OTHER PUBLICATIONS

Herzog et al, Chemical Abstracts vol. 66, abst. no. 121643h (1967).
Emmert, Ber. Deut. Chem. vol. 49, pages 1060 to 1062 (1916).
Utke et al., J. Org. Chem. vol. 28, pp. 3582 to 3584 (1963).
Utke et al., J. Org. Chem. vol. 29, pp. 1261 to 1264 (1964).

Primary Examiner—John D. Randolph

[57] ABSTRACT

Polymerization initiators are produced by contacting elemental calcium metal with pyridine-type compounds.

26 Claims, No Drawings

3,997,708

ORGANOCALCIUM PYRIDINE-TYPE POLYMERIZATION INITIATORS

This application is a continuation-in-part of application Ser. No. 790,429 filed Jan. 10, 1969, now abandoned.

FIELD OF THE INVENTION

This invention relates to a process for manufacturing polymerization initiators and to the compositions of matter thereby produced. In another embodiment, this invention relates to a polymerization process utilizing a unique initiator.

It is well recognized that there are known organoalkali metal compounds such as the alkyllithium and sodium compounds suitable as initiators for the polymerization of hydrocarbon monomers such as conjugated dienes or vinyl-substituted aromatic hydrocarbons. These known initiators are effective for the polymerization of hydrocarbon monomers such as conjugated dienes or vinyl-substituted aromatic hydrocarbons to form homopolymers and copolymers of random and block configurations, but they are often not suitable for the polymerization of various other types of monomers such as $\alpha,\beta$-unsaturated nitriles, esters of acrylic and methacrylic acids, vinylpyridines, vinylquinolines, vinylpyrrolidones, vinyl ketones, vinyl esters, and the like. These organoalkali metal compounds often react with these latter named monomers at temperatures ordinarily suited for polymerization instead of effecting polymer formation.

SUMMARY OF THE INVENTION

It has now been discovered that polymerization initiators can be produced from pyridine-type compounds, i.e., compounds containing at least one pyridine nucleus such as pyridine, bipyridine, quinoline, isoquinoline, acridine, or phenanthroline, when contacted with calcium metal.

It has also been discovered that the unique initiators that are formed according to this invention are effective polymerization initiators capable of polymerizing a large variety of monomers with which the organoalkali metal compounds often react at temperatures ordinarily suited for polymerization. Our novel initiators are effective to polymerize monomers such as the polymerizable $\alpha,\beta$-unsaturated nitriles, esters of acrylic and methacrylic acid, vinyl ketones, vinylpyridines, vinylquinolines, vinylpyrrolidones, vinyl esters, and the like, at temperatures ordinarily suited for polymerization.

OBJECTS OF THE INVENTION

It is an object of this invention to produce a novel polymerization initiator capable of polymerizing broad varieties of polymerizable monomers such as $\alpha, \beta$-unsaturated nitriles, vinyl ketones, vinylpyridines, vinylquinolines, vinylpyrrolidones, esters of acrylic and methacrylic acid, or vinyl esters, and the like.

It is still another object of this invention to provide a novel polymerization process. Other objects, advantages, and features of our invention will be apparent to those skilled in the art from the disclosure and discussion herein set forth.

DETAILED DESCRIPTION OF THE INVENTION

Those pyridine-type compounds suitable for reaction with calcium metal according to this invention in order to form the initiators are selected from pyridines, bipyridines, or polycyclic fused-ring aromatic compounds wherein at least one of said fused rings is a pyridine ring, and wherein the number of carbon atoms of the pyridine, bipyridine, or polycyclic fused-ring aromatic compound is 5 to 40 and wherein the said pyridine-type compounds can contain alkyl, cycloalkyl, aryl, alkoxy, aryloxy, alkylthio, arylthio, or N,N-dialkylamino substituents and combinations thereof such as cycloalkylalkyl, arylalkyl, and the like; and wherein the number of carbon atoms in the said substituents is from 1 to 24. These compounds can also contain halogen substituents: i.e., chloro, fluoro, bromo, and iodo.

Presently preferred is a ratio of gram atoms of calcium metal to moles of pyridine-type compound in the range of about 1:1 to 25:1.

Presently preferred of the pyridines are pyridine itself and the alkylsubstituted pyridines, of these more preferred being pyridine and monoalkylsubstituted pyridines, and wherein each alkyl group contains 1 to 6 carbon atoms. Presently preferred of the bipyridines are unsubstituted bipyridines and alkyl substituted bipyridines, of these more preferred being 2,2'-bipyridine and the monoalkyl substituted 2,2'-bipyridines, and wherein each alkyl group contains 1 to 6 carbon atoms. Presently preferred of the polycyclic fused-ring aromatic compounds in which at least one fused-ring is a pyridine ring is the group consisting of quinoline, isoquinoline, 1,10-phenanthroline, acridine, and the alkyl-substituted quinolines, isoquinolines, 1,10-phenanthrolines, and acridines, of these more preferred being the unsubstituted and monoalkyl substituted, and wherein each alkyl group contains 1 to 6 carbon atoms.

Exemplary of those compounds which can be contacted with elemental calcium according to this invention comprise: benzo[b]-1,5-naphthyridine; pyrido[2,3-g]quinoline; benzo[c][1,8]naphthyridine; phenanthridine; pyrido[2,3-f][1,7]phenanthroline; dibenzo[b,g][1,8]naphthyridine; naphth[1,2-h]isoquinoline; quino[5,6-b][4,7]phenanthroline; naphtho-[1,2-b][4,7]phenanthroline; dibenz[b,i]acridine; acridino[1,2-a]acridine; phenaleno-[1,2,3-k,l]acridine; dinaphtho[2,3-c:2',3'-i]phenanthridine; 4-cyclopentyl-6-phenoxydinaphth[2,3-a:2,3'-j]acridine; 1-phenyl-5-ethoxy-benzo[c]benz[5,6]acridino[3,4-h]acridine; 2-(4-ethylphenyl)-6-butylthio-benzo[1,2-c:5,4-c']diacridine; 3-phenylthio-7-cyclohexylmethyl-9-(N,N-diethylamino)phenanthro[2,1,10-m,n,a]acridine; 2-benzyl-quino[5,6-b][1,7]phenanthroline; 1-chloro-10-ethoxy-benzo[c][1,7]naphthyridine; 5-bromo-10-ethyl-4,7-phenanthroline; 7-iodo-10-phenyl-benzo[c][2,7]naphthyridine; 4-phenythio-4'-N,N-dibutylamino-2,2'-bipyridine; 4-chloro-4'-bromo-3,3'-bipyridine; 1,4,5,8-tetraphenylacridine, 4-phenylpyridine; 5-methylquinoline; 4,4'-dichloro-2,2'-bipyridine; 3-ethoxy-2,3'-bipyridine; 4-cyclohexylisoquinoline; 9-fluoroacridine; 8-bromo-1,5-phenanthroline; 9-iodo-1,8-phenanthroline; pyridine; 2,2'-bipyridine; 2,3'-bipyridine; 2,4'-bipyridine; 3,3'-bipyridine; 3,4'-bipyridine; 4,4'-bipyridine; quinoline; isoquinoline; acridine; 1,5-phenanthroline; 1,8-phenanthroline; 4,5-phenanthroline, 2-methylpyridine; 3-methylpyridine; 4-methylpyridine; 2,6-dimethylpyridine; 3,5-dimethylpyridine; 5-methyl-3,4'-bipyridine; 4-methyl-2,2'-bipyridine; 3-methyl-2,2'-bipyridine; 6-tert-butylisoquinoline; 3-methylisoquinoline; 2-hexylquinoline; 4-methylquinoline; 1-methylacridine; 3-hexylacridine; 1,10-phenanthroline; 5,6-diethyl-1,10-phenanthroline; 4-methyl-1,10-phenanthroline, and the like.

When preparing the initiators of this invention, substantially pure elemental calcium is employed in the form of turnings or shot, or the like, so as to provide a form of metal with as much exposed surface metal as possible. It is important that the metal be protected from air and maintained accordingly so as to prevent the formation of oxides thereon.

The pyridine-type compound, and the elemental metal are brought together at a temperature in the range of about −100° to 200° F, preferably about −20° to 125° F. The contacting is carried out in the presence of an ethereal diluent of mono- or polyethers including acyclic and cyclic ethers. Alkyl, aryl or cycloalkyl ethers, or combinations thereof, containing 2 to 20 carbon atoms per molecule and about 1 to 4 ether groups per molecule can be employed. Exemplary ethers are diethyl ether; dibutyl ether; methyl butyl ether; phenyl methyl ether; diphenyl ether; cyclohexyl methyl ether; tetrahydrofuran; 1,2-dimethoxyethane; 1,4-dioxane; and the like. Tetrahydrofuran; 1,2-dimethoxyethane; or 1,4-dioxane are the preferred diluent ethers.

The ethereal diluents are believed likely to form ether complexes with the calcium/pyridine compound adduct thus produced.

When very finely divided calcium is employed such as produced by vaporization of said metals in an electric furnace as described by V. Sinn, B. Francois, N. Mayer, and J. Parrod in Compt. Rend. (Paris), 262, Ser. C, pp 541–544 (1966), it is unnecessary to contact the pyridine compound and the calcium metal in the presence of an ether diluent. The contacting can then be carried out generally in any inert diluent such as aliphatic, aromatic, cycloaliphatic, or araliphatic hydrocarbons and the like. Employment of the vaporized metal is not the preferred procedure due to the more costly and more complex electric furnace procedure used for the preparation of very finely divided metal.

Metals that have been prepared by such a method often possess polymerization initiator activity themselves, but are, however, generally inferior to the initiators of this invention. The solutions or suspensions of initiators produced according to this invention are more easily handled in charging, measuring, or other transfer operations than the vaporized metal themselves. This subsequently results in improved control of the polymerization reaction in terms of initiator level and thus molecular weight of the polymer. Another disadvantage of conducting polymerization reactions with finely divided metals as produced by the electric furnace method is that they often show long induction periods and then rapid uncontrolled reaction. Also, these very finely divided metals are more susceptible to inactivation by accidental contact with air or other oxygen-containing gases resulting in inactivation of large portions of the finely divided metal by the formation of an oxide surface coating thereon.

A quantitative determination of the extent of initiator formation can be made by employing a hydrolyzed portion of the initiator reaction mixture and analyzing by titration, with an acid such as hydrochloric acid and employing phenolphthalein as an indicator or by any other suitable analytical method known to the art, so as to measure the alkaline molarity of that reaction mixture. When the alkaline molarity of the calcium reaction mixture is essentially equal to the molar concentration of the starting pyridine compound essentially complete conversion to the calcium initiator has been obtained; assuming that only one gram atom of calcium forms an initiator with one mole of pyridine compound.

Organic promoters which react immediately to expose fresh calcium surface metal can also be employed during the preparation of the initiator. Alkyl or alkylene halogen-containing promoters such as 1,2-dibromoethane, methyl iodine, ethyl bromide, or ethyl iodide and the like function accordingly. The well-known Grignard reaction utilized such a promoter as described in Organo-Metallic Compounds by G.E. Coates, pp 46–47, 2nd Edition, John Wiley and Sons, Inc. New York (1960).

The amount of promoter, if employed, is generally in the range of about 0.002 to 0.2 mole, preferably about 0.005 to 0.1 mole per gram atom of calcium metal, and preferably containing the bromide or iodide halogen with 1,2-dibromoethane being the preferred promoter for use with this invention.

The initiators can be washed in a non-reactive liquid in which they are less soluble, in comparison to the ethereal diluent in which they were originally formed. The washing removes excess unreacted organic components and removes excess diluent ether. Aliphatic or aromatic hydrocarbons such as xylene, toluene, n-pentane, or isooctane are suitable washing liquids. Toluene is the washing liquid preferred. The initiators suitable for washing, as herein described, are those recoverable from the ether diluent.

As hereinbefore mentioned, the calcium/pyridine compound initiators of this invention can be used to polymerize a broad variety of monomers to form homopolymers and random and block copolymers. $\alpha,\beta$-unsaturated nitriles, esters of acrylic and methacrylic acid, vinyl ketones, vinylpyridines, vinylquinolines, vinylpyrrolidones, vinyl esters and the like are effectively polymerized in the presence or absence of diluents. Any diluent which is relatively inert, non-deleterious, and liquid under the reaction conditions of the process can be utilized. Hydrocarbon diluents such as paraffins, cycloparaffins, aromatics and the like, can be used as well as others well known to the art. Conditions ordinarily suited and well known in the art for polymerization can be employed with temperatures generally in the range of about −100° to 200° F, with the range from −20° to 125° F being preferred. Higher and lower temperatures can be employed if desired. The initiator is generally employed in a concentration of about 0.1 to 100 (mhm) gram millimoles per 100 grams of monomer(s) employed and preferably 1 to 20 (mhm).

Polymerizable Compounds

Our novel initiators are effective to polymerize monomers such as the polymerizable $\alpha,\beta$-unsaturated nitriles, esters of acrylic and methacrylic acid, vinyl ketones, vinylpyridines, vinylquinolines, vinylpyrrolidones, vinyl esters, and the like. Of these, presently preferred for use with our initiators are the $\alpha,\beta$-unsaturated nitriles, esters of acrylic and methacrylic acid, vinyl ketones, vinylpyridines, and vinyl pyrrolidones; more preferred are the $\alpha,\beta$-unsaturated nitriles, esters of methacrylic acid, and vinylpyridines; more preferred are monomers of 3 to 20 carbon atoms per molecule.

Exemplary of those polymerizable compounds are acrylonitrile; methacrylonitrile; cinnamonitrile; 2-butene nitrile; 2-octene nitrile; 2-dodecene nitrile; 2-methyl-2-dodecene nitrile; methyl acrylate; ethyl acrylate; butyl acrylate; cyclohexyl acrylate; dodecyl acrylate; methyl methacrylate; ethyl methacrylate; butyl methacrylate; cyclohexyl methacrylate; octyl methacrylate; dodecyl methacrylate; benzyl acrylate; benzyl methacrylate; vinyl acetate; vinyl butyrate; vinyl 2-ethylhexanoate; vinyl octanoate; vinyl cyclohexanoate; vinyl benzoate; vinyl phenylacetate; vinyl dodecanoate; methyl vinyl ketone; benzyl vinyl ketone; ethyl vinyl ketone; butyl vinyl ketone; octyl vinyl ketone; phenyl vinyl ketone; 1-naphthyl vinyl ketone; 2-ethylhexyl vinyl ketone; cyclohexyl vinyl kentone; cyclododecyl vinyl ketone; 3-methyl-cyclopentyl vinyl ketone; 4-ethylphenyl vinyl ketone; decyl vinyl ketone; 5-cyclopentyl-2-naphthyl vinyl ketone; 2-vinylpyridine; 4-vinylpyridine; 2-methyl-5-vinylpyridine; 4-vinylquinoline; 2-methyl-8-vinylquinoline; 1-vinyl-2-pyrrolidone; 1-vinyl-3,3-dimethyl-2-pyrrolidone; 2-ethylhexyl acrylate; 2-ethylhexyl methacrylate; or the like.

The reaction medium employed for preparing the initiators of this invention is also suitable for the polymerization process and in situ technique can be employed for preparing initiator adducts and for conducting the polymerization process. In this method of operation, all materials for initiator preparation and polymerization are charged initially. As the calcium reaction product is formed, it initiates polymerization of the monomer present in the system.

Since many types of monomers can be polymerized in the presence of this initiator, a wide variety of products can be obtained. Products ranging from low to high molecular weight are produced depending upon the monomers used as well as the type and amount of initiator. Products can be obtained which range from liquids to elastomers and hard plastics.

The solid polymers prepared according to our invention can be employed to produce by conventional methods various molded plastic articles such as containers and the like. The low molecular weight polymers can be vulcanized to produce hard, resinous potting compounds for the electrical industry. They can also be employed for various other uses such as plasticizers, tackifiers and the like.

The elastomeric polymers can be compounded with vulcanizing agents, fillers, antioxidants, plasticizers, extender oils, and the like, to produce rubbery products suitable for use as tire treads, hose, belting, gaskets, and the like.

The polymers can also be blended with each other, or with various types of known polymeric products to produce useful articles.

EXAMPLE I

Calcium was reacted with 2,2'-bipyridine and the following recipe was employed for the preparation of the initiator:

| | |
|---|---|
| 2,2'-Bipyridine, mole | 0.010 |
| Calcium turnings, gram atom | 0.10 |
| 1,2-Dibromoethane, mole | 0.001 (0.10 ml) |
| Tetrahydrofuran, ml. | 100 |
| Calcium:bipyridine mole ratio | 10:1 |
| Temperature, ° F | 41 |
| Time, hours | 141 |
| Alkalinity, M | 0.105 |
| Conversion of bipyridine, % | 100 |

The bipyridine was charged to the reactor followed by the calcium turnings and then the tetrahydrofuran. The reactor was flushed with argon, pressured to 20 psig with argon, and the dibromoethane was added. The temperature was adjusted to 41' F for the reaction. The alkalinity of the reaction product was determined by titration with 0.1 N HCl and the extent of conversion with the bipyridine was calculated from the titration value.

Example I exemplifies fruition of this invention by successfully demonstrating the preparation and production of the calcium/pyridine-type compound initiators of this invention.

EXAMPLE II

The initiator of Example I was employed as an initiator for the polymerization of methyl methacrylate, methyl vinyl ketone, a mixture of methyl methacrylate and methyl vinyl ketone, and 2-vinylpyridine. Table I gives the quantities of various monomers employed, the quantities of the initiator from Example I, temperature and time of each reaction, the weight percent of the monomer conversion, and inherent viscosity of the polymer product produced.

Polymerizations were conducted in the presence of either toluene or cyclohexane as a diluent which was charged first in all runs. The reactor was then purged with nitrogen, then closed, flushed, and pressured with argon. In the methyl methacrylate run, the initiator was charged following the diluent, the mixture was cooled in an ice bath, the monomer was added, the temperature was adjusted to 41° F for the polymerization. In the methyl vinyl ketone and vinylpyridine runs, the monomer was charged following the diluent, the mixtures were cooled in an ice bath, the initiator was added, and the temperature was adjusted to 41° F for the polymerization. This latter order was followed for polymerizing a mixture of methyl methacrylate and methyl vinyl ketone with the ketone being charged first.

All runs were terminated with isopropyl alcohol. The mixture from the methyl methacrylate run was poured into an excess of isopropyl alcohol to coagulate the polymer which was then separated and dried in an vacuum oven at 140° F. Some polymer precipitated during polymerization of the methyl vinyl ketone. The liquid phase was decanted and the liquid was removed by evaporation. The solid product was dissolved in acetone, the mixture was filtered, and the filtrate was evaporated to dryness to recover this portion of polymer. The polymer obtained from polymerizing the mixture of methyl methacrylate and methyl vinyl ketone was recovered by evaporation of the liquid from the terminated reaction mixture. The reaction mixture containing a 2-vinylpyridine polymer was stirred with cyclohexane, filtered, and the solid product dried under vacuum at 140° F. Solid polymers were obtained in all cases.

TABLE I

| | Runs | | | |
|---|---|---|---|---|
| | 1 | 2 | 3 | 4 |
| Toluene, parts by weight | 870 | — | 870 | — |
| Cyclohexane, parts by weight | — | 780 | — | 780 |
| Methyl methacrylate, parts by weight | 100 | — | 50 | — |
| Methyl vinyl ketone, parts by weight | — | 100 | 50 | — |
| 2-Vinylpyridine, parts by weight | — | — | — | 100 |
| Initiator, mhm | 5.2 | 5.2 | 5.2 | 5.25 |
| Temperature, ° F | 41 | 41 | 41 | 41 |
| Time, hours | 115 | 47 | 24 | 17.75 |
| Conversion, % | 100 | 76 | 44.8 | 94 |

TABLE I-continued

| | Runs | | | |
|---|---|---|---|---|
| | 1 | 2 | 3 | 4 |
| Inherent Viscosity | 1.66[1] | 0.04[1] | 0.05[1] | 2.00[1] |

[1]Determined in chloroform.

A film was cast from chloroform solution using the product from Run 3. The film was scanned by infrared. A strong band appeared at 3,450 cm$^{-1}$, not present in poly(methyl methracrylate) spectra. In addition, the strong band at 1,710cm$^{-1}$ was slightly moved from the 1,690 cm$^{-1}$ in poly(methyl methacrylate).

The product from Run 4 was analyzed for nitrogen and found to contain 12.8 weight percent nitrogen. This polymer was a white, powdery solid that had a melting point of 146° C.

The novelty of this invention is clearly exemplified in the foregoing example and Table I by demonstrating the effectiveness of our invention to produce these novel polymerization initiators and their ability to polymerize a broad variety of monomers.

As will be evident to those skilled in the art, various modifications of this invention can be made, or followed, in light of the teaching and discussion set forth herein without departing from the scope or spirit of our invention.

What is claimed is:

1. A polymerization process which comprises reacting under solution polymerization conditions and temperatures a polymerizable monomer with an effective initiating amount of an organocalcium polymerization initiator prepared by the process which comprises contacting substantially pure calcium metal with a pyridinetype compound in a hydrocarbon or ethereal diluent or mixture, in the substantial absence of oxygen and ammonia,
    wherein said pyridine-type compound is selected from the group consisting of pyridines, bipyridines, and polycyclic fused-ring aromatic compounds wherein at least one of said fused rings is a pyridine ring and the remainder of said rings are carbocyclic rings, wherein the number of carbon atoms of said pyridine-type compound is in the range of 5 to 40,
    employing a ratio of gram atoms of said calcium metal to moles of said pyridine-type compound in the range of about 1:1 to 25:1, and
    wherein said polymerizable monomer contains 3 to 20 carbon atoms per molecule and is an $\alpha,\beta$-unsaturated nitrile, alkyl, cycloalkyl, and aralkyl ester of acrylic and methacrylic acid, vinyl ketone, vinylpyridine, vinylquinoline, vinylpyrrolidone, or vinyl ester of a hydrocarbon monocarboxylate.

2. The polymerization process of claim 1 wherein said contacting of said calcium metal with said pyridine-type compound is conducted in said ethereal diluent, and said ethereal diluent contains 2 to 20 carbon atoms and 1 to 4 ether groups per molecule and wherein said contacting is at a temperature in the range of −100° to 200° F.

3. The polymerization process of claim 2 wherein said pyridine-type compound is 2;2'-bipyridine; 2,3'-bipyridine; 2,4'-bipyridine; 3,3'-bipyridine; 3,4'-bipyridine; 4,4'-bipyridine; quinoline; isoquinoline; acridine; 1,5-phenanthroline; 1,8-phenanthroline; or 4,5-phenanthroline.

4. The polymerization process of claim 3 wherein said diluent employed in said contacting of said calcium with said pyridine-type compound is tetrahydrofuran; 1,2-dimethoxyethane; or 1,4-dioxane.

5. The polymerization process of claim 1 wherein said contacting of said calcium metal with pyridinetype compound process further includes the addition of a promoter in the range of 0.002 to 0.2 mole per gram atom of said calcium metal, and wherein said promoter is a halogen-containing organic compound that reacts substantially immediately to expose fresh surface area calcium metal.

6. The polymerization process of claim 1 wherein said substantially pure calcium metal has been priorly finely divided by the vaporization thereof.

7. The polymerization process of claim 2 wherein said polymerizable monomer is selected from the group consisting of acrylonitrile, methacrylonitrile, cinnamonitrile, 2-butene nitrile, 2-octene nitrile, 2-dodecene nitrile, 2-methyl-2-dodecene nitrile, methyl acrylate, ethyl acrylate, butyl acrylate, cyclohexyl acrylate, octyl acrylate, dodecyl acrylate, methyl methacrylate, ethyl methacrylate, butyl methacrylate, cyclohexyl methacrylate, octyl methacrylate, dodecyl methacrylate, benzyl acrylate, benzyl methacrylate, vinyl acetate, vinyl butyrate, vinyl 2-ethyl-hexanoate, vinyl octanoate, vinyl cyclohexanoate, vinyl benzoate, vinyl phenylacetate, vinyl dodecanoate, methyl vinyl ketone, benzyl vinyl ketone, ethyl vinyl ketone, butyl vinyl ketone, octyl vinyl ketone, phenyl vinyl ketone, 1-naphthyl vinyl ketone, 2-ethylhexyl vinyl ketone, cyclohexyl vinyl ketone, cyclododecyl vinyl ketone, 3-methylcyclopentyl vinyl ketone, 4-ethylphenyl vinyl ketone, decyl vinyl ketone, 5-cyclopentyl-2-naphthyl vinyl ketone, 2-vinylpyridine, 4-vinylpyridine, 2-methyl-5-vinylpyridine, 4-vinylquinoline, 2-methyl-8-vinylquinoline, 1-vinyl-2-pyrrolidone, 1-vinyl-3,3-dimethyl-2-pyrrolidone, 2-ethylhexyl acrylate, and 2-ethylhexyl methacrylate.

8. A polymerization process which comprises polymerizing under conditions suitable for solution polymerization in hydrocarbon or etheral diluent or mixture at polymerization temperatures in the range of −100° to 200° F a polymerizable monomer with an organocalcium polymerization initiator,
    wherein said polymerizable monomer is an $\alpha,\beta$-unsaturated nitrile, alkyl, cycloalkyl, and aralkyl ester of acrylic and methacrylic acid, vinyl ketone, vinylpyridine, vinylquinoline, vinylpyrrolidone, or vinyl ester of a hydrocarbon monocarboxylic acid of 3 to 20 carbon atoms per molecule, and
    wherein said organocalcium initiator is prepared by contacting substantially pure calcium metal with a pyridine-type compound containing 5 to 40 carbon atoms per molecule selected from the group consisting of pyridines, bipyridines, and polycyclic fused-ring aromatic compounds wherein at least one of said fused rings is a pyridine ring and the remainder of said rings are carbocyclic rings, employing a ratio of gram atoms of said calcium metal to moles of said pyridine-type compound in the range of about 1:1 to 25:1, wherein said contacting of said calcium metal with said pyridine-type compound is conducted at a temperature in the range of about −100° to 200° F. in an ethereal or hydrocarbon diluent, in the substantial absence of oxygen and ammonia, and wherein said polymerization process employs a concentration of said organocalcium initiator of about 0.1 to 100 gram millimoles per 100 grams of polymerizable monomer employed.

9. The polymerization process of claim 8 wherein said polymerizable monomer is an α,β-unsaturated nitrile, alkyl, cycloalkyl, or aralkyl ester of acrylic or methacrylic acid, vinylpyridine, vinylpyrrolidone, or vinyl ketone.

10. The polymerization process of claim 9 wherein said polymerizable monomer is 2-vinylpyridine, methyl methacrylate, or methyl vinyl ketone.

11. The polymerization process of claim 8 wherein sid organocalcium polymerization initiator is prepared in situ during said polymerization process.

12. The polymerization process according to claim 9 wherein said pyridine-type compound is pyridine or monoalkyl-substituted pyridine wherein said alkyl group contains 1 to 6 carbon atoms.

13. The polymerization process of claim 6 wherein said diluent employed in said contacting of said calcium with said pyridine-type compound is said hydrocarbon diluent and is aliphatic, cycloaliphatic, or aryl hydrocarbon.

14. The polymerization process according to claim 7 wherein said pyridine-type compound is pyridine, alkyl-substituted pyridine of up to 6 carbon atoms per alkyl group, unsubstituted bipyridine, alkyl-substituted pyridine containing up to 6 carbon atoms per alkyl group, quinoline, isoquinoline, 1,10-phenanthroline, acridine, alkyl-substituted quinolines of up to 6 carbon atoms per alkyl group, alkyl-substituted isoquinolines of up to 6 carbon atoms per alkyl group, alkyl-substituted 1,10-phenanthroline of up to 6 carbon atoms per alkyl group, or alkyl-substituted acridine of up to 6 carbon atoms per alkyl group.

15. The polymerization process according to claim 14 wherein said pyridine-type compound is pyridine, monoalkyl-substituted pyridine of up to 6 carbon atoms in the alkyl group, 2,2'-bipyridine, monoalkyl-substituted 2,2'-bipyridine wherein the alkyl group contains up to 6 carbon atoms, quinoline, isoquinoline, 1,10-phenanthroline, acridine, monoalkyl-substituted quinoline of up to 6 carbon atoms in the alkyl group, monoalkyl-substituted isoquinoline of up to 6 carbon atoms in the alkyl group, monoalkyl-substituted 1,10-phenanthroline of up to 6 carbon atoms in the alkyl group, or monoalkylsubstituted acridine of up to 6 carbon atoms in the alkyl group.

16. The polymerization process according to claim 1 wherein said pyridine-type compound is benzo[b]-1,5-naphthyridine, pyrido[2,3-g]quinoline, benzo[c][1,8-]naphthyridine, phenanthridine, pyrido[2,3-f][1,7]phenanthroline, dibenzo[b,g][1,8]naphthyridine, naphth[1,2-h]isoquinoline, quino[5,6-b][4,7]phenanthroline, naptho-[1,2-b]8 4,7]phenanthroline, dibenz[b,i]acridine, acridino[1,2-a]acridine, phenaleno-[1,2,3-k,l]acridine, dinaphtho[2,3-c:2',3'-i]phenanthridine, 4-cyclopentyl-6-phenoxy-dinaphth[2,3-a:2,3'-j]acridine, 1-phenyl-5-ethoxy-benzo[c]benz[5,6]acridino[3,4-h]acridine, 2-(4-ethylphenyl)-6-butylthio-benzo[1,2-c:5,4-c']diacridine, 3-phenylthio-7-cyclohexylmethyl-9-(N,N-diethylamino)-phenanthro[2,1,10-m,n,a]acridine; 2-benzyl-quino[5,6-b][1,7]phenanthroline;

1-chloro-10-ethoxy-benzo[c][1,7]naphthyridine, 5-bromo-10-ethyl-4,7-phenanthroline; 7-iodo-10-phenylbenzo[c][2,7]naphthyridine; 4-phenylthio-4'-N,N-dibutylamino-2,2'-bipyridine; 4-chloro-4'-bromo-3,3'-bipyridine; 1,4,5,8-tetraphenylacridine, 4-phenylpyridine; 5-methylquinoline; 4,4'-dichloro-2,2'-bipyridine; 3-ethoxy-2,3'-bipyridine; 3-ethoxy-2,3'-bipyridine; 4-cyclohexylisoquinoline; 9-fluoroacridine; 8-bromo-1,5-phenanthroline; 9-iodo-1,8-phenanthroline; pyridine; 2,2'-bipyridine; 2,3'-bipyridine; 2,4'-bipyridine; 3,3'-bipyridine; 3,4'-bipyridine; 4,4'-bipyridine; quinoline; isoquinoline; acridine; 1,5-phenanthroline; 1,8-phenanthroline; or 4,5-phenanthroline.

17. The polymerization process according to claim 7 wherein said pyridine-type compound is 5-methylquinoline, pyridine, 2,2'-bipyridine, 2,3'-bipyridine; 2,4'-bipyridine, 3,3'-bipyridine; 3,4'-bipyridine; 4,4'-bipyridine, quinoline, isoquinoline, acridine, 1,5-phenanthroline, 1,8-phenanthroline;

4,5-phenanthroline, 2-methylpyridine; 3-methylpyridine; 4-methylpyridine;

2,6-dimethylpyridine; 3,5-dimethylpyridine; 5-methyl-3,4'-bipyridine;

4-methyl-2,2'-bipyridine; 3-methyl-2,2'-bipyridine; 6-tert-butylisoquinoline;

3-methylisoquinoline; 2-hexylquinoline; 4-methylquinoline; 1-methylacridine;

3-hexylacridine; 1,10-phenanthroline; 5,6-diethyl-1,10-phenanthroline;

or 4-methyl-1,10-phenanthroline.

18. The polymerization process according to claim 17 wherein said pyridine-type compound is: pyridine; 2,2'-bipyridine; quinoline; isoquinoline; acridine; 2-methylpyridine; 3-methylpyridine; 4-methylpyridine; 4-methyl-2,2'-bipyridine; 3-methyl-2,2'-bipyridine; 6-tert-butylisoquinoline; 3-methylisoquinoline; 2-hexylquinoline; 4-methylquinoline; 1-methylacridine; 3-hexylacridine; 1,10-phenanthroline; 4-methyl-1,10-phenanthroline.

19. The polymerization process according to claim 8 wherein said calcium is contacted with said pyridine-type compound at a contacting temperature in the range of about −20 to 125° F in the presence of an ethereal diluent wherein said ethereal diluent contains 2 to 20 carbon atoms per molecule and 1 to 4 ether groups per molecule.

20. The polymerization process according to claim 19 wherein said ether is diethyl ether, dibutyl ether, methylbutyl ether, phenylmethyl ether, diphenyl ether, cyclohexylmethyl ether, tetrahydrofuran, 1,2-dimethoxyethane, or 1,4-dioxane.

21. The polymerization process according to claim 8 wherein said initiator-forming reaction conditions include contacting in the temperature range of about −100 to 200° F, in the presence of said hydrocarbon diluent, said calcium metal is employed in the form of a finely divided calcium prepared by a vaporization process, and said contacting is conducted in the substantial absence of oxygen.

22. The polymerization process according to claim 8 wherein said initiator-forming reaction conditions include the employment during the preparation of the initiator of an organic promoter effective to react to expose fresh calcium surface metal during the preparation of the initiator, said organic promoter is an alkyl or alkylene halogen-containing promoter, and said promoter is employed in the range of about 0.002 to 0.2 mole per gram atom of calcium metal.

23. The polymerization process according to claim 8 wherein said pyridine-type compound further can contain alkyl, cycloalkyl, aryl, alkoxy, aryloxy, alkylthio, arylthio, N,N-dialkylamino, or combination substituents, wherein the number of carbon atoms in total of said substitutents is 1 to 24.

24. The polymerization process according to claim 9 wherein said pyridine-type compound is 2,2'-bipyridine, said ethereal diluent is tetrahydrofuran, and said contacting is in the presence of a promotor which is 1,2-dibromoethane.

25. The polymerization process according to claim 9 wherein said pyridine-type compound is a bipyridine.

26. The polymerization process according to claim 25 wherein said pyridine-type compound is 2,2'-bipyridine; and said diluent employed in formation of said initiator is said ethereal diluent and is tetrahydrofuran.

* * * * *

UNITED STATES PATENT AND TRADEMARK OFFICE
CERTIFICATE OF CORRECTION

PATENT NO. : 3,997,708
DATED : December 14, 1976
INVENTOR(S) : James D. Brown; Carl A. Uraneck It is certified that error appears in the above-identified patent and that said Letters Patent are hereby corrected as shown below:

Column 7, line 36, delete "pyridinetype" and insert -- pyridine-type --. Column 8, line 6, delete "pyridinetype" and insert -- pyridine-type --; line 6, after "with" insert -- said --. Column 9, line 28, delete "pyridine" and insert -- bipyridine --; line 47, delete "monoalkylsubstituted" and insert -- monoalkyl-substituted --; line 49, delete "1" and insert -- 7 --; line 55, delete "8" and insert -- [ --.

Signed and Sealed this

Tenth Day of May 1977

[SEAL]

Attest:

RUTH C. MASON
Attesting Officer

C. MARSHALL DANN
Commissioner of Patents and Trademarks